(12) United States Patent
McCoy et al.

(10) Patent No.: US 12,316,217 B1
(45) Date of Patent: May 27, 2025

(54) FREQUENCY BAND AVOIDANCE IN AN ON-DEMAND SWITCHED-POWER CONVERTER CIRCUIT

(71) Applicant: CIRRUS LOGIC INTERNATIONAL SEMICONDUCTOR LTD., Edinburgh (GB)

(72) Inventors: Bryan W. McCoy, Phoenix, AZ (US); Siddharth Maru, Austin, TX (US); Alban Shemsedini, El Mirage, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 245 days.

(21) Appl. No.: 18/325,036

(22) Filed: May 29, 2023

Related U.S. Application Data

(60) Provisional application No. 63/398,944, filed on Aug. 18, 2022.

(51) Int. Cl.
*H02M 1/44* (2007.01)
*H02M 3/158* (2006.01)

(52) U.S. Cl.
CPC ............ *H02M 1/44* (2013.01); *H02M 3/158* (2013.01)

(58) Field of Classification Search
CPC ................................ H02M 1/44; H02M 3/158
See application file for complete search history.

(56) References Cited

U.S. PATENT DOCUMENTS

| | | | | |
|---|---|---|---|---|
| 6,091,349 A | * | 7/2000 | Chadha | H03M 3/368 341/118 |
| 6,377,198 B1 | * | 4/2002 | Johnston | H03K 17/6872 341/122 |
| 6,950,044 B1 | * | 9/2005 | Piasecki | H03M 1/0872 341/118 |
| 7,382,300 B1 | * | 6/2008 | Nanda | H03M 3/346 341/143 |
| 7,515,076 B1 | | 4/2009 | Singh et al. | |
| 8,994,569 B2 | * | 3/2015 | Ebata | H03M 1/1076 341/155 |

* cited by examiner

*Primary Examiner* — Rafael O De Leon Domenech
(74) *Attorney, Agent, or Firm* — Mitch Harris, Atty at Law, LLC; Andrew M. Harris

(57) ABSTRACT

A method implemented by a control circuit reduces electromagnetic interference (EMI) generation in a switched-mode power supply. The power supply adjusts operating frequency in response to a change in operating condition, and the method avoids certain bands of frequencies, for which switching should be avoided to avoid generating EMI in the band(s). The method includes determining a disallowed cycle time period range corresponding to the band(s) of frequencies by detecting that a switching event for the adjusted operating frequency would cause a switching cycle period to be within the disallowed time period range, and in response, preventing switching of the switched-mode power supply that would cause an end of a switching cycle to occur within the disallowed cycle time period range, and permitting switching of the switched-mode power supply that would cause the end of the switching cycle to occur outside of the disallowed cycle time period range.

24 Claims, 9 Drawing Sheets

US 12,316,217 B1

FREQUENCY BAND AVOIDANCE IN AN ON-DEMAND SWITCHED-POWER CONVERTER CIRCUIT

FIELD OF THE DISCLOSURE

The field of representative embodiments of this disclosure relates to operational control of switched-mode power supplies, amplifiers and other switched-mode power output systems, and in particular, to techniques for avoiding particular switching period/frequency ranges in a switched-power system to prevent or reduce electromagnetic interference generation in the frequency ranges.

BACKGROUND

Switched-power circuits are commonly used in power supplies and amplification systems due to high power efficiency and reduced magnetic component weight and size. By switching current at a frequency greater than the frequencies to be reproduced by an amplifier, or by switching energy generally, in the case of switching power supplies, the size of magnetic components is reduced and losses required by linear circuit operation are eliminated.

Switched circuits, and particularly those having magnetic storage elements such as inductors or transformers generate both conducted and induced/radiated electromagnetic interference (EMI). Techniques exist for reducing EMI or reducing the impact of EMI such as frequency-hopping to avoid generating EMI concentrated in particular frequency ranges or in frequency ranges where other equipment may be sensitive. However, such solutions can increase circuit complexity or reduce efficiency. In particular, when a switched-mode power supply is operated intermittently, such as in a high-efficiency/low-power operating mode such as a pulse-frequency modulated (PFM) mode, control of the generated spectrum may not be possible without compromising on-demand operation. When such a converter is in steady-state operation, EMI issues are exacerbated, since the frequency of operation will typically not vary much unless the operating conditions change, e.g., load current and input voltage for a power supply that is regulating to a fixed output voltage.

Therefore, it would be advantageous to provide an on-demand switched-power converter circuit in which generated EMI may be prevented from occurring in frequency ranges that are to be avoided.

SUMMARY

Reduced generation of EMI by a switched-mode power supply, is provided in a control method and power supply including a control circuit.

The method is a method of reducing electromagnetic interference (EMI) by a switched-mode power supply and is implemented by a control circuit of the switched-mode power supply. The method includes adjusting an operating frequency of the switched-mode power supply in response to a change in demand or input voltage, determining a disallowed cycle time period range corresponding to a band of frequencies for which the switched-mode power supply should be prevented from operating in order to avoid generating the electromagnetic interference in the band of frequencies, and detecting that a switching event of the switched-mode power supply for the adjusted operating frequency would cause a switching cycle period to be within the disallowed time period range. In response to detecting that the switching event would cause the switching cycle period to be within the disallowed cycle time period range, the method prevents switching of the switched-mode power supply, and in response to detecting that the switching event of the switched-mode power supply would not cause the switching cycle period to be within the disallowed cycle time period, the method permits switching of the switched-mode power supply.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION

The present disclosure encompasses systems, circuits and integrated circuits that control switched-mode power supplies (SMPSs) or other switched-power circuits to reduce generated EMI. The SMPS is generally a type of SMPS that responds by adjusting operating frequency when a change in demand or input voltage occurs, which may be operation in a low-power mode, such as in a SMPS that changes from pulse-width modulated (PWM) mode to pulse frequency mode (PFM), when demand for output current is low. The control circuit implements a method that includes: determining a disallowed cycle time period range corresponding to a band of frequencies for which operation should be avoided to prevent electromagnetic interference in the band of frequencies, detecting that a switching event for the adjusted operating frequency would cause a switching cycle period to be within the disallowed time period range, and in response, preventing switching of the switched-mode power supply that would cause an end of a switching cycle to occur within the disallowed cycle time period range, and permitting switching of the switched-mode power supply that would cause the end of the switching cycle to occur outside of the disallowed cycle time period range.

Figure 1:
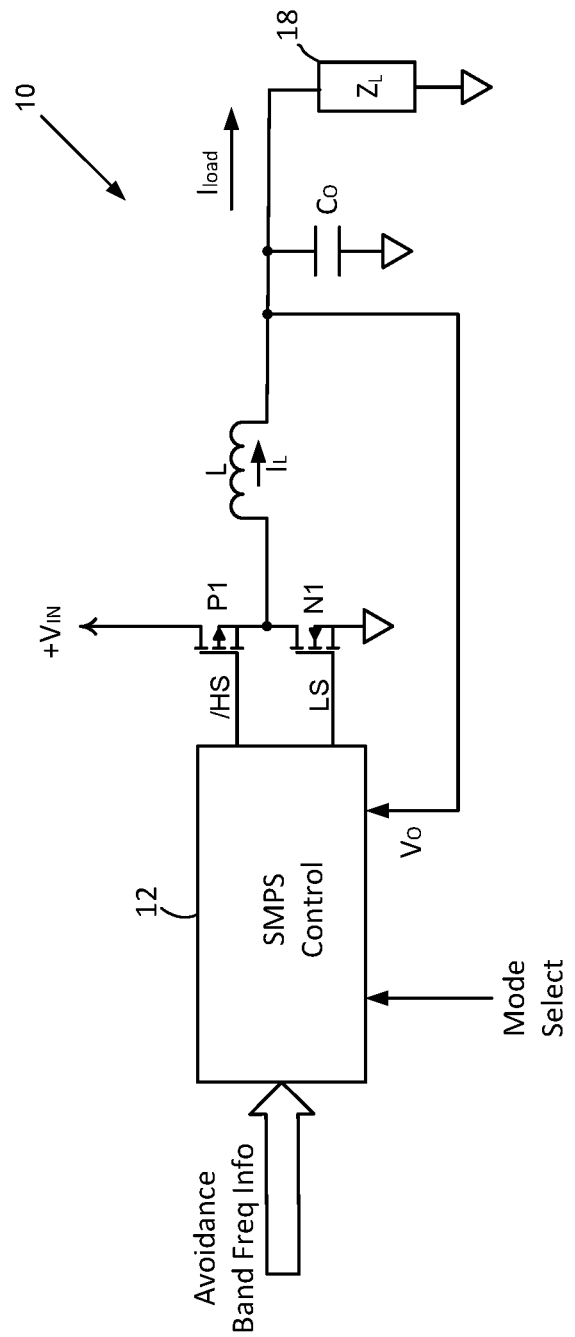
FIG. 1 is a simplified schematic diagram illustrating an example switched-mode power supply (SMPS) 10, in accordance with an embodiment of the disclosure.

Referring now to FIG. 1, a simplified schematic diagram of an example SMPS 10 is shown, in accordance with an embodiment of the disclosure. A SMPS control circuit 12 receives as input, information regarding frequency bands for which switching operation is to be avoided (Avoidance Band Freq Info) and controls operation of an example buck converter switched-power stage formed by transistor P1 and N1. Transistors P1 and N1 direct a current $I_L$ through an inductor L, that in turn, charges an output filter capacitor $C_O$ to maintain an output voltage $V_O$ across a load 18, by supplying a load current $I_{load}$. Transistor P1 is activated according to a high-side control signal /HS, and then transistor N1 is activated by a low-side control signal LS. SMPS control circuit 12 avoids generating switching cycles of switched-power stage formed by transistor P1 and N1 that have periodicities that fall within the frequency bands for which switching operation is to be avoided according to input information Avoidance Band Freq Info. The particular SMPS topology in the form of a buck converter as illustrated by SMPS 10 is only one example of a system in which the techniques disclosed herein may be employed, and the disclosed techniques may be applied to SMPS circuits and other switched-power delivery systems generally.

Figure 2:
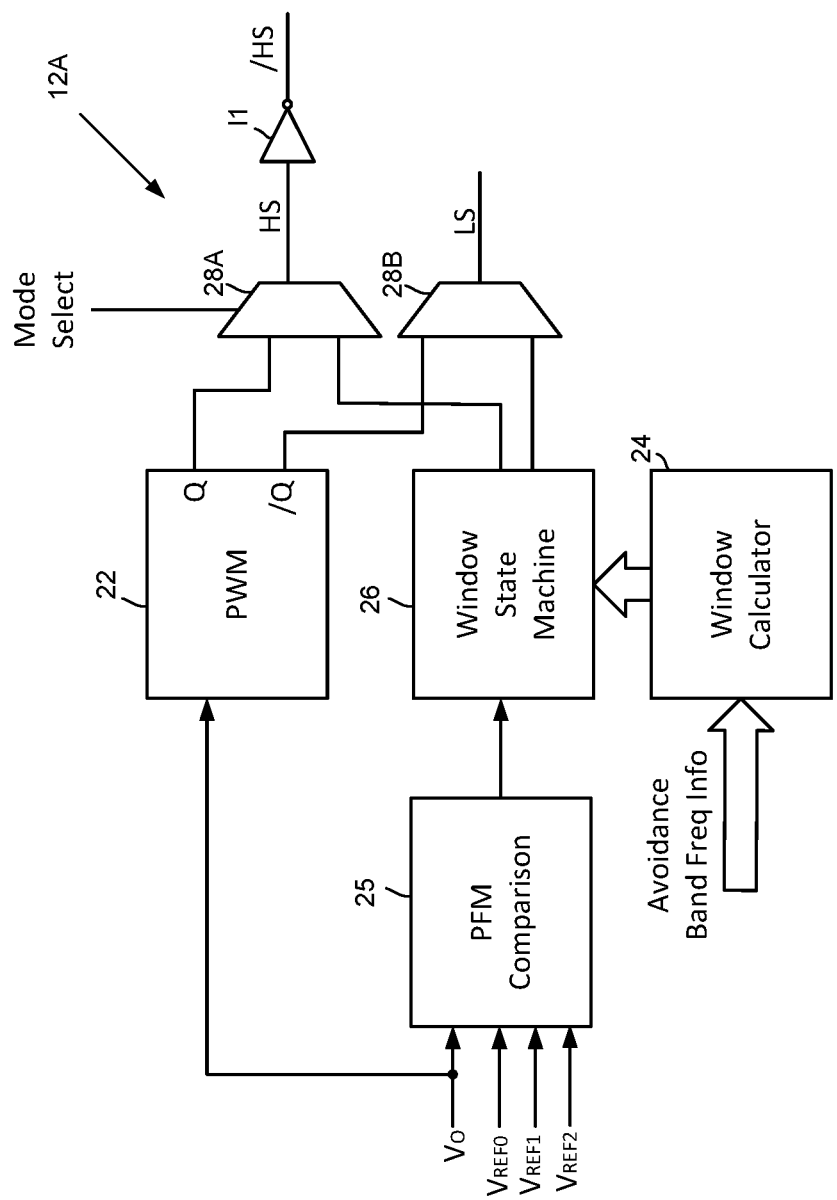
FIG. 2 is simplified schematic diagram illustrating details of an example SMPS control circuit 12A, which may be used to implement SMPS control circuit 12 in example SMPS 10 of FIG. 1, in accordance with an embodiment of the disclosure.

Referring now to FIG. 2, a simplified schematic diagram illustrating details of an example SMPS control circuit 12A, which may be used to implement SMPS control circuit 12 in example SMPS 10 of FIG. 1 is shown, in accordance with an embodiment of the disclosure. A PFM comparison circuit 25 compares output voltage $V_O$ with a reference voltage $V_{REF0}$ and operates a window state machine 26 that implements a PFM converter control. Reference threshold voltage $V_{REF0}$ represents a voltage level at which the PFM operation in low-power mode operates to generate a pulse to maintain output voltage $V_O$ at a nominal level. PFM comparison block 25 may implement other threshold level comparisons to reference threshold voltages $V_{REF1}$ and $V_{REF2}$, in order to provide more complex control of when to override or avert prevention of switching periods that would fall within a disallowed frequency range, as will be described in further detail below. Multiplexers 28A and 28B select between operation in PFM mode by window state machine 26, or operation in a PWM mode from a PWM modulator block 22, according to an operating mode selection signal Mode Select. An inverter I1 inverts the sense of high-side control signal HS to generate high-side control signal /HS for activating PFET transistor P1 of FIG. 1. A window calculator 24 determines time periods/counts that correspond to input information Avoidance Band Freq Info, and controls window state machine 26 to load timer/counters that determine whether the PFM output frequency falls within a disallowed frequency range, and prevents generating cycles during PFM operation that are initiated with pulses on high-side control signal HS and low-side control signal LS that would fall within a disallowed frequency range.

Figure 3:
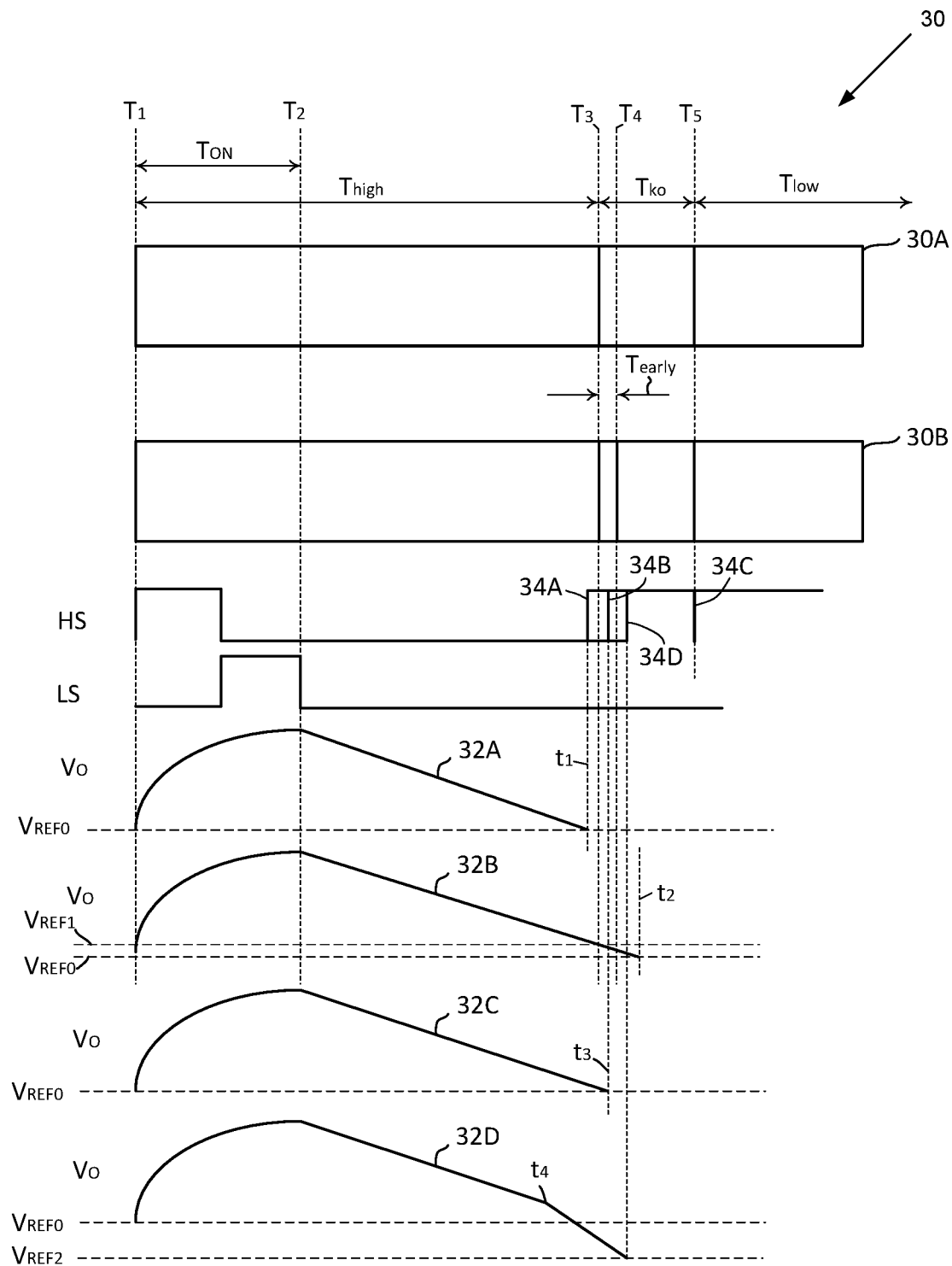
FIG. 3 is a timing diagram 30 illustrating an example operation of example SMPS control circuit 12A of FIG. 2, in accordance with an embodiment of the disclosure.

Referring additionally to FIG. 3, a timing diagram 30 illustrating an example operation of example SMPS control circuit 12A of FIG. 2 is shown, in accordance with an embodiment of the disclosure. A first operating scheme 30A that disallows the start of a new cycle that would cause a repetition of switching, i.e., a periodic switching, that falls within a disallowed band of frequencies, prevents starting a new PFM cycle within a keep-out time interval $T_{ko}$. In an interval $T_{high}$, repetition would be fast enough for a switching frequency to lie above the keep-out frequency range, and in a time interval $T_{low}$, repetition would be slow enough for the switching frequency to lie below the keep-out frequency range. $T_{ON}$ illustrates the active time of the PFM cycle, with high-side switch first activated according to a pulse of high-side switch control signal HS to charge inductor L, and then subsequently, low-side switch activated according to a pulse of low-side switch control signal LS. In embodiments described in further detail below, window state machine 26 of FIG. 2 may implement another time interval $T_{early}$, during which switching may be permitted if output voltage $V_O$ falls below an upper threshold voltage $V_{REF1}$ according to a second operating scheme 30B. Waveforms 32A-32C illustrate three different levels of load current, and therefore three different times at which output voltage $V_O$ crosses reference threshold voltage $V_{REF0}$, which would trigger another cycle of the PFM operation. Waveform 32D illustrates a changing level of load current at a time t4 that causes output voltage $V_O$ to fall below a reference threshold voltage $V_{REF2}$, which may cause faulty operation of a circuit powered by SMPS 10 if another cycle of PFM operation were not triggered during keep-out time interval $T_{ko}$. In waveform 32A, the load current is sufficiently high, that a new cycle is triggered within time interval $T_{high}$, so a new cycle may be permitted, as represented by a rising edge 34A of high-side switch control signal HS. In waveform 32B, output voltage $V_O$ crosses reference threshold voltage $V_{REF0}$ within keep-out time interval $T_{ko}$, so a new cycle should only be started at the beginning of time interval $T_{low}$, as represented by a rising edge 34C of high-side switch control signal HS. In embodiments described in further detail below, window state machine 26 of FIG. 2 implements another time interval $T_{early}$, during which switching may be permitted if output voltage $V_O$ falls below a upper threshold voltage $V_{REF1}$, predicting a need for energy to maintain output voltage $V_O$, as illustrated by waveform 32C, with permitted switching during time interval time interval $T_{early}$ represented by rising edge 34B of high-side switch control signal HS. In some embodiments, if output voltage $V_O$ falls below a lower threshold voltage $V_{REF2}$, indicating that output voltage $V_O$ has fallen near or below a minimum voltage requirement, as illustrated by waveform 32D, and an override of switching cycle prevention is represented by rising edge 34D of high-side switch control signal HS. In such circumstances, the pulse widths of high-side switch control signal HS and low-side switch control signal LS may also be increased to provide a higher energy level in the next cycle(s), which should prevent a higher load current from persistently overriding the keep-out window.

Figure 4:
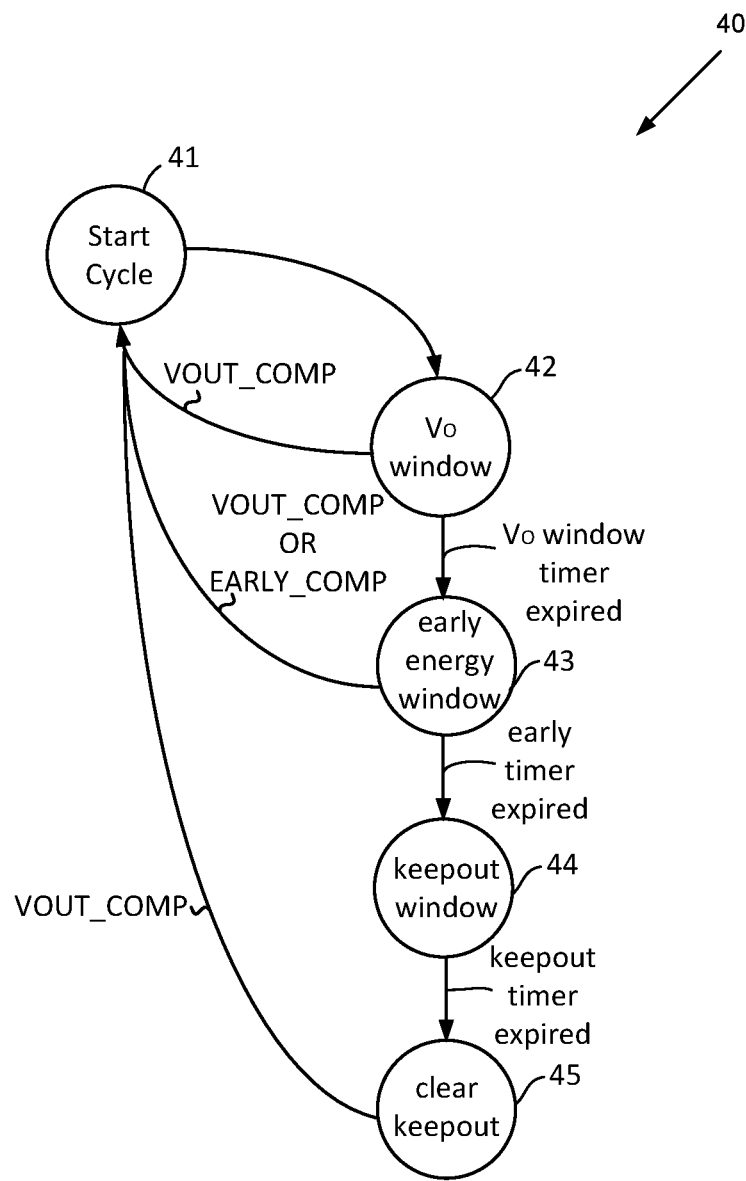
FIG. 4 is a state diagram 40 illustrating example operation of example SMPS control circuit 12A of FIG. 2, in accordance with an embodiment of the disclosure.

Referring now to FIG. 4, a state diagram 40 illustrating example operation of example SMPS control circuit 12A of FIG. 2 is shown, in accordance with an embodiment of the disclosure. In State 41 a new PFM cycle is started, and a timer is started to count the $V_O$ window, which corresponds to time interval $T_{high}$ in FIG. 3 (State 42). If output voltage $V_O$ falls below lower threshold voltage $V_{REF0}$, as indicated by control signal /value VOUT_COMP before the $V_O$ timer has expired, operation returns to State 41 and a new cycle is begun. If the $V_O$ window expires first, operation proceeds to state 43, which starts the timer for time interval $T_{early}$. If either of control signal /value VOUT_COMP or a control signal /value EARLY_COMP produced by the comparison of output voltage $V_O$ to threshold voltage $V_{REF1}$, indicates that the respective thresholds have been crossed during time interval $T_{early}$, operation returns to State 41 and a new cycle is begun. Otherwise, operation enters State 44 and a timer counts keep-out time interval $T_{ko}$. After keep-out time interval $T_{ko}$ has expired, operation enters State 45, which clears the keep-out state that prevents cycling of the SMPS. Once output voltage $V_O$ falls below lower threshold voltage $V_{REF0}$, as indicated by control signal /value VOUT_COMP, operation returns to State 41 and a new cycle is begun. In any of States 41-45, if SMPS control circuit 12A of FIG. 2 includes a comparison to lower threshold voltage $V_{REF2}$, operation returns immediately to State 41 and a new cycle is begun, optionally with the higher energy level described above.

Figure 5A:
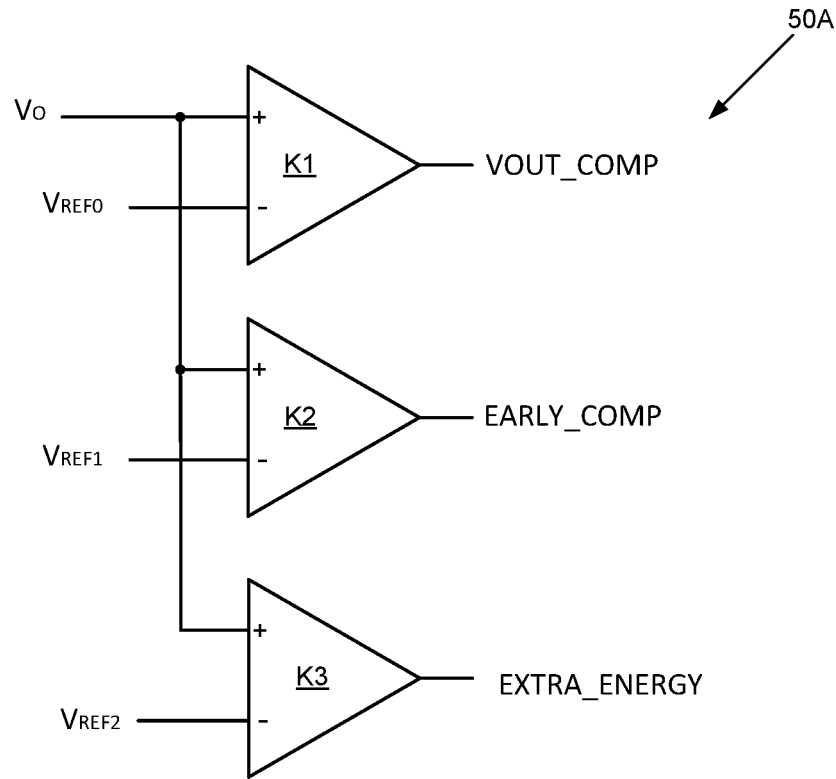
FIG. 5A is a schematic diagram illustrating an example comparison circuit 50A that may be used to implement PFM comparison circuit 25 in SMPS control circuit 12A of FIG. 2, in accordance with an embodiment of the disclosure.

Referring now to FIG. 5A, a schematic diagram illustrating an example comparison circuit 50A that may be used to implement PFM comparison circuit 25 in SMPS control circuit 12A of FIG. 2 is shown, in accordance with an embodiment of the disclosure. Comparison circuit 50A uses three different comparators K1-K3 to compare output voltage $V_O$ with respective threshold voltages, reference voltage $V_{REF0}$, upper threshold voltage $V_{REF1}$, and lower threshold voltage $V_{REF2}$ to generate control signal /values VOUT_COMP, EARLY_COMP and EXTRA_ENERGY, respectively.

Figure 5B:
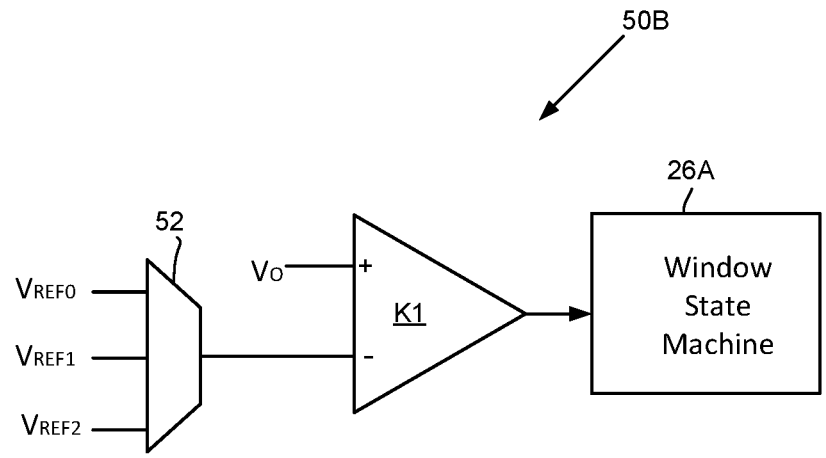
FIG. 5B is a schematic diagram illustrating another example comparison circuit 50B that may be used to implement PFM comparison circuit 25 in SMPS control circuit 12A of FIG. 1, in accordance with another embodiment of the disclosure.

Referring now to FIG. 5B, a schematic diagram illustrating another example comparison circuit 50B that may be used to implement PFM comparison circuit 25 in SMPS control circuit 12A of FIG. 2 is shown, in accordance with another embodiment of the disclosure. Since output voltage $V_O$ can be presumed to be monotonically decreasing during an interval in which the energized portion of a switching cycle has ended, and before a next cycle is triggered, a multiplexer 52 may be used with a single comparator K1 to select a reference threshold from among reference voltage $V_{REF0}$, upper threshold voltage $V_{REF1}$, and lower threshold voltage $V_{REF2}$ in sequence under control of window state machine 26A. For example, and with reference again to state machine 40 of FIG. 4, multiplexer 52 may select reference voltage $V_{REF0}$ in State 42, upper threshold voltage $V_{REF1}$ in State 43 and lower threshold voltage $V_{REF2}$ in State 44.

Figure 6:
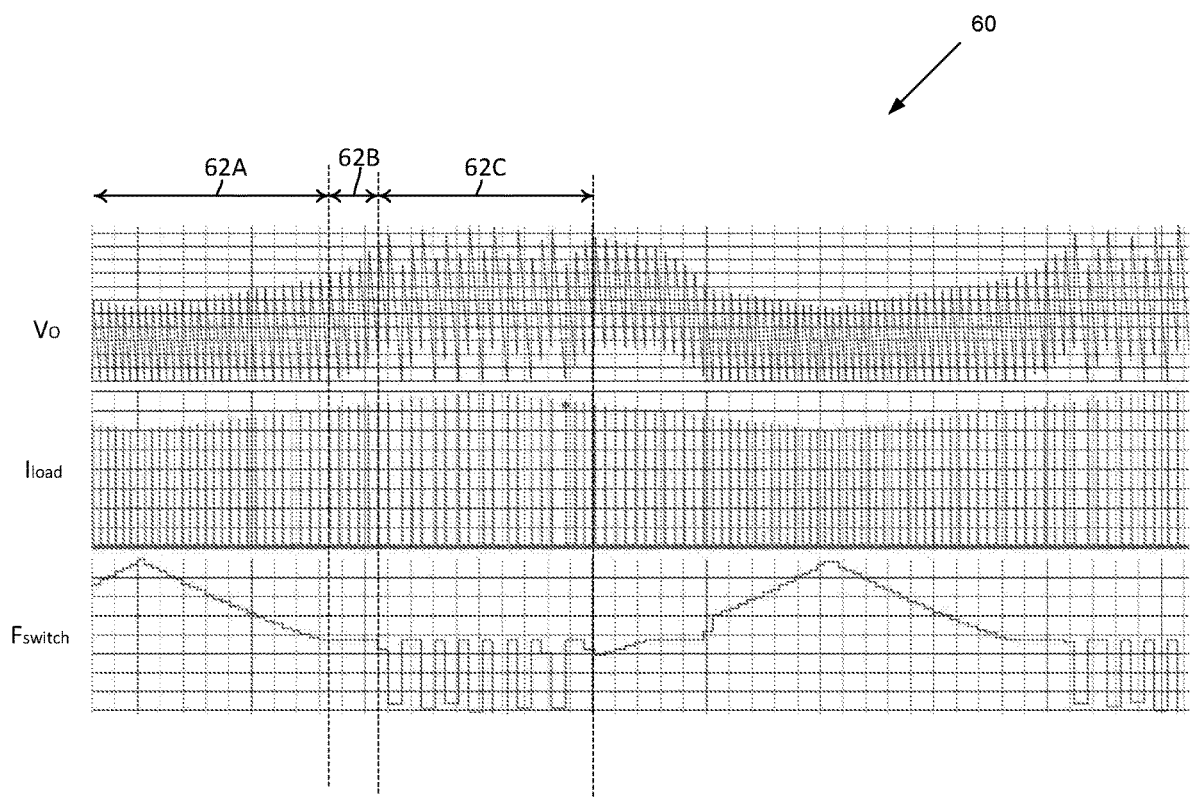
FIG. 6 is a graph illustrating example operation of example SMPS 10 of FIG. 1, in accordance with an embodiment of the disclosure.

Referring now to FIG. 6, a graph illustrating example operation of example SMPS 10 of FIG. 1 is shown, in accordance with an embodiment of the disclosure. The graph illustrates an example in which the reference voltages are modulated with a triangular peak current distribution, which modulates the target operation of the PFM operating scheme. Switching frequency $F_{switch}$ is the actual switching frequency as implemented by the techniques described above. In region 62A, the operating frequency follows the modulated pattern. In region 62B, the frequency is held essentially constant, as the switching frequency falls into a keep-out frequency range, and in region 62C, operation toggles between frequencies above and below the keep-out range. Such modulation may be applied to further steer the operating frequency away from frequency bands for which EMI generation should be avoided, or may be used to spread the energy of the generated EMI that lies outside of those bands.

Figure 7:
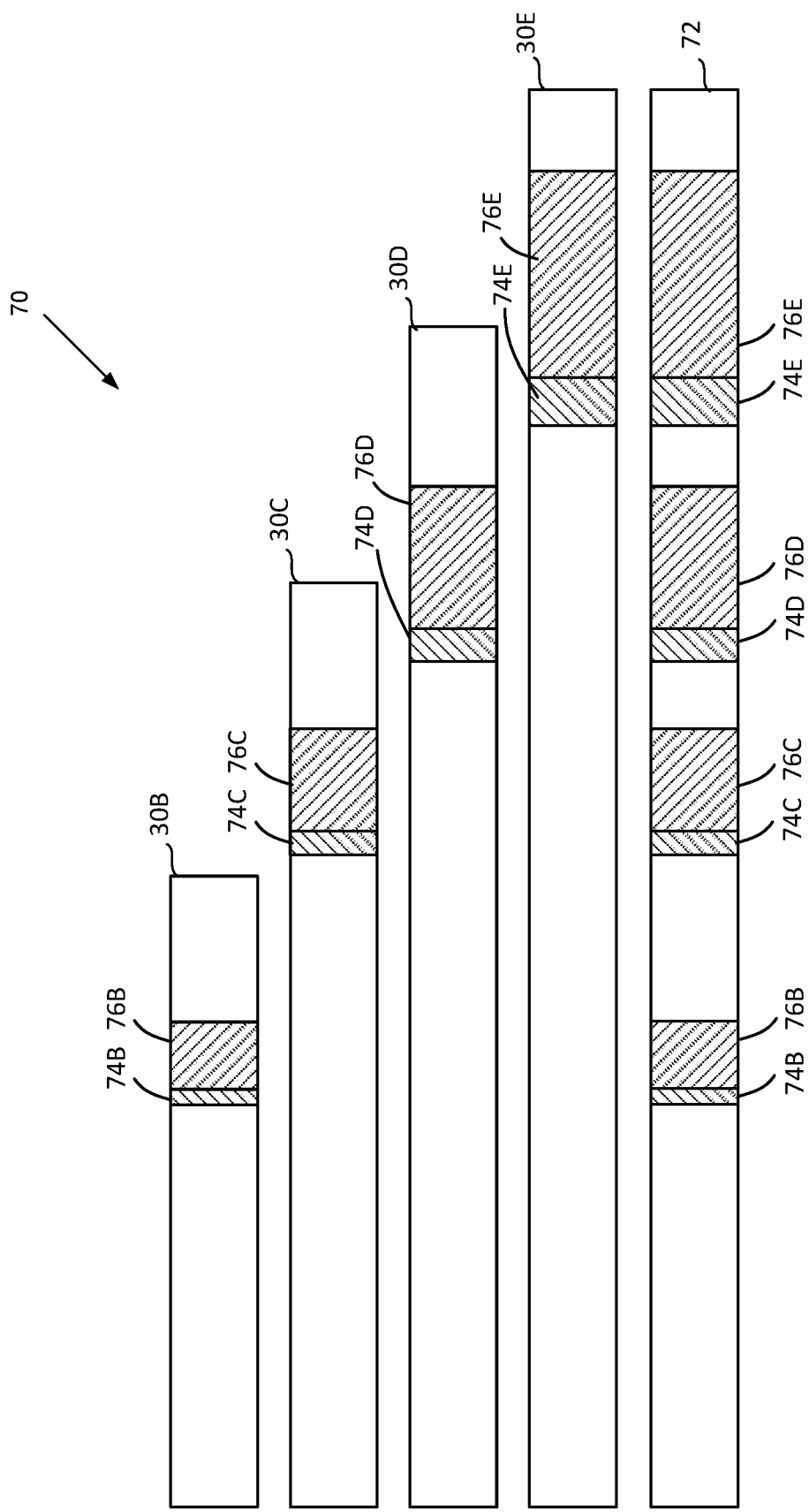
FIG. 7 is a time-state diagram 70 illustrating another example operation of example SMPS control circuit 12A of FIG. 2, in accordance with another embodiment of the disclosure.

FIG. 7 is a time-state diagram 70 illustrating another example operation of example SMPS control circuit 12A of FIG. 2, in accordance with another embodiment of the disclosure. Operating scheme 30B, as described above with reference to FIG. 3, corresponds to a first keep-out frequency range, implementing keep-out time interval $T_{ko}$ across timespans 74B and 76B, and time interval $T_{early}$ during timespan 74B. Other operating schemes 30C-30E, correspond to other ranges of frequencies in which switching of SMPS 10 should be prevented, according to input information Avoidance Band Freq Info, which specifies multiple frequency ranges, which correspond to different timespans 74C-76C. 74D-76D, and 74E-76E, with timespans 76C, 76D, and 76E providing early energy permitted switching. A combined operating scheme, that may be implemented by window state machine 26, implements the multiple keep-out intervals and early switching intervals described above, by combining the four different timespans 74A-76A, 74C-76C. 74D-76D, and 74E-76E, as shown in the Figure.

Figure 8:
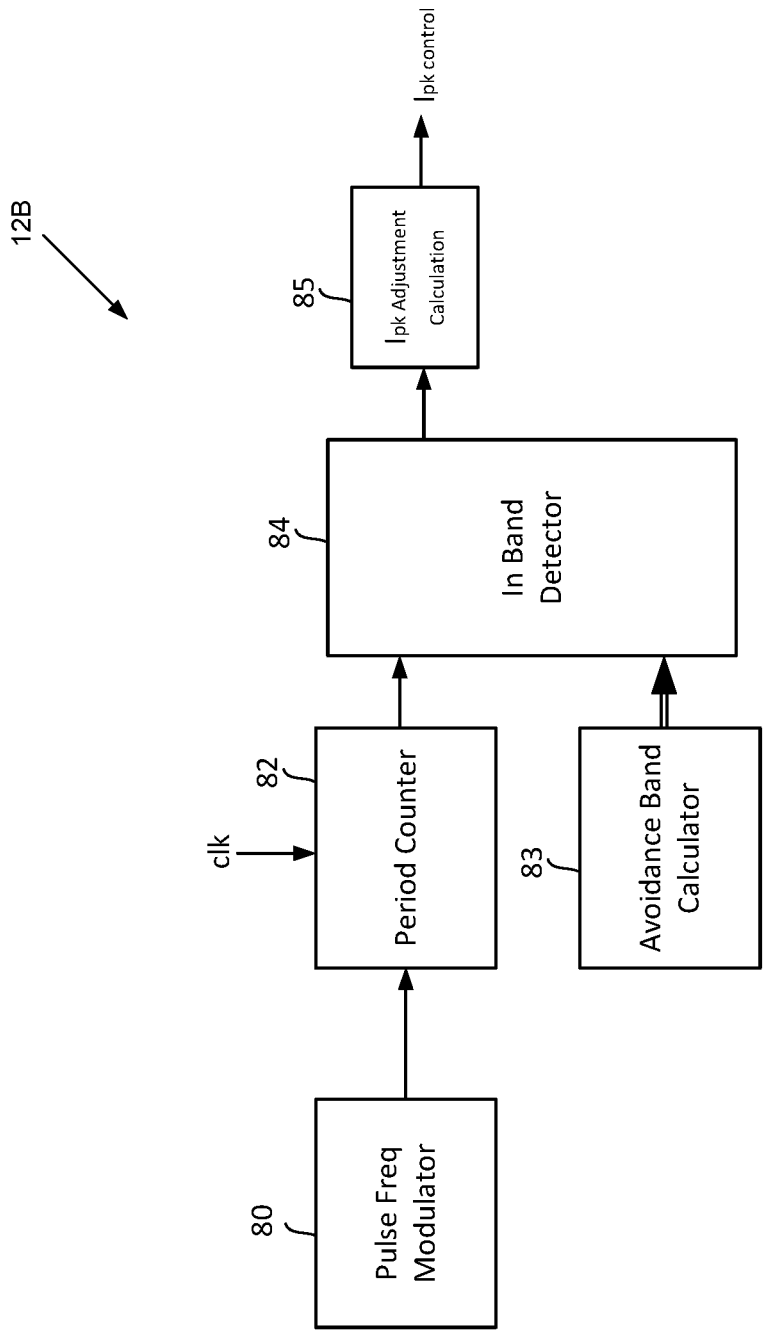
FIG. 8 is a block diagram illustrating details of another example SMPS control circuit 12B, which may be used to implement SMPS control circuit 12 in example SMPS 10 of FIG. 1, in accordance with another embodiment of the disclosure.

Referring now to FIG. 8, a block diagram illustrating details of another example SMPS control circuit 12B, which may be used to implement SMPS control circuit 12 in example SMPS 10 of FIG. 1 is shown, in accordance with another embodiment of the disclosure. SMPS control circuit 12B is a controller that controls peak inductor current $I_{pk}$, which may be controlled by varying a width of the pulses of high-side control signal HS and low-side control signal LS in SMPS 10 of FIG. 1. A pulse-frequency modulator 80, which may be operated from a reference threshold voltage $V_{REF0}$ as described above, has an output coupled to a period counter 82, and the measured average switching period over an interval, for example, four switching cycles, may be compared with one or more ranges of periods determined by an avoidance band calculator 83. An in-band detector block 84 detects when the switching rate of the PFM modulation scheme lies within the one or more disallowed frequency ranges, and a peak inductor current $I_{pk}$ adjustment calculation block 85 determines and applies the adjustment to a control value $I_{pk}$ control to change the peak current so that the detected frequency range is avoided. The adjustment may be computed as follows: 1) determine that the switching frequency lies in a disallowed band by counting clock cycles, 2) accumulate successive in-band "hits", and 3) if the number of successive hits >N (e.g., 3) then make an adjustment to control value $I_{pk}$ control to increment (or decrement) $I_{pk}$ control as needed for the switching frequency to fall outside of the disallowed frequency range, and until an upper (or lower) bound is reached on control value $I_{pk}$ control, at which time control value $I_{pk}$ control may be reset to the other bound. Control value $I_{pk}$ control may alternatively be calculated using stored values of the peak inductor current and measured value of the offending frequency, since a target peak inductor current $Ipk_{target}$ may be computed from a present peak inductor current $Ipk_{current}$, the present frequency $F_{current}$, and a target frequency $F_{target}$ that lies outside of the disallowed frequency range, according to:

$$Ipk_{target} = Ipk_{current} \times \sqrt{\frac{F_{current}}{F_{target}}}$$

or, in terms of periods/counts:

$$Ipk_{target} = Ipk_{current} \times \sqrt{\frac{T_{target}}{T_{current}}}.$$

Rather than computing the square roots, the target peak inductor current may be computed as:

$$Ipk_{target} = Ipk_{current} \times \left(1 + \frac{\left(\frac{T_{target}}{T_{current}}\right) - 1}{2}\right),$$

which has low error and the added benefit that a larger increase/decrease in peak inductor current will be computed, resulting in a target operating frequency/period that lies further outside of the disallowed frequency range.

Figure 9:
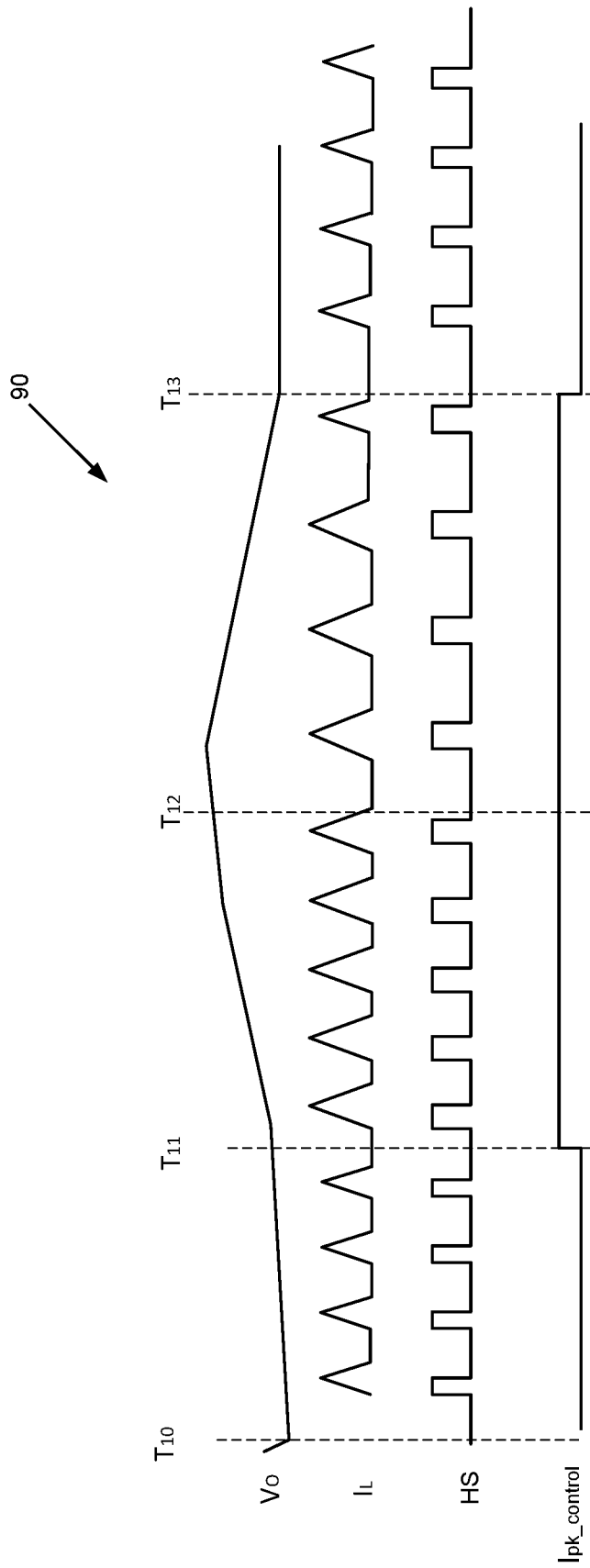
FIG. 9 is a signal waveform diagram 90 illustrating details of operation of SMPS control circuit 12B, as applied in example SMPS 10 of FIG. 1, in accordance with another embodiment of the disclosure.

Referring to FIG. 9, a signal waveform diagram 90 illustrating details of operation of SMPS control circuit 12B, as applied in example SMPS 10 of FIG. 1 is shown, in accordance with another embodiment of the disclosure. An output voltage $V_O$ waveform is shown, which varies with a change in the peak value $I_{pk}$ of inductor current $I_L$. Starting at time $T_{10}$, the value of output voltage $V_O$ has fallen, causing the switching frequency of SMPS 10 to rise into a disallowed frequency range, as illustrated by high-side control signal HS. After four cycles, at a time $T_{11}$, SMPS control circuit 12B adjusts control value $I_{pk}$ control to increase the peak value of inductor current $I_L$, which causes the frequency of the PFM switching cycles to decrease at time $T_{11}$. After four cycles, at a time $T_{13}$, SMPS control circuit 12B adjusts control value $I_{pk}$ control to decrease the peak inductor current $I_L$ until SMPS control circuit 12B determines that another adjustment is needed. As mentioned above, the peak inductor current $I_L$ may be adjusted by increasing or decreasing the magnetization on time by adjusting a width of high-side control signal HS. Additionally, changes may be made by slightly adjusting output voltage $V_O$. Alternatively, SMPS control circuit 12B may control the average inductor current, rather than the peak inductor current.

In summary, this disclosure shows and describes techniques and circuits for reducing electromagnetic interference (EMI) by a switched-mode power supply. The method may include: adjusting an operating frequency of the switched-mode power supply in response to a change in demand or input voltage of the switched-mode power supply, and determining a disallowed cycle time period range corresponding to a band of frequencies for which the switched-mode power supply should be prevented from operating in order to avoid generating the electromagnetic interference in the band of frequencies. The method may detect that a switching event of the switched-mode power supply for the adjusted operating frequency would cause a switching cycle period to be within the disallowed time period range, and may, responsive to detecting that the switching event of the switched-mode power supply would cause the switching cycle period to be within the disallowed cycle time period range, prevent switching of the switched-mode power supply. The method may, responsive to detecting that the switching event of the switched-mode power supply would not cause the switching cycle period to be within the disallowed cycle time period, permit switching of the switched-mode power supply.

In some example embodiments, the determining may repetitively determine the disallowed cycle time period for consecutive cycles, and the preventing and the permitting may be repeated for the consecutive cycles. In some example embodiments, the method may further include determining an early cycle time period range prior to the disallowed cycle time period range, determining that additional energy is required in a current or future cycle for maintaining an output voltage or current level of the switched-mode power supply, and responsive to determining that the additional energy is needed, completing the current switching cycle ahead of an ordinary cycle end time during the early cycle time period. In some example embodiments, the preventing and permitting may be initiated by one or more timers of a control circuit in the switched-mode power supply, and the method may further include first comparing an output voltage of the switched-mode power supply to a first threshold voltage to determine whether a switching cycle should be initiated, and second comparing the output voltage of the switched-mode power supply to a second threshold voltage to determine whether or not the additional energy is required in the current or future cycle. The method may first determine whether or not a first one of the timers has expired and second determine whether or not a second one of the timers has expired and the second timer may have a period longer than that of the first timer. The method may, responsive to having determined that the first timer has not expired, perform the initiating the switching cycle in response to either of the first comparing having determined that the cycle should be initiated or the second comparing having determined that the additional energy is required. The method may, responsive to having determined that the first timer has expired and having determined that the second timer has not expired, initiate the switching cycle in response to the second comparing determining that the additional energy is required. The method may, responsive to the first determining having determined that the first timer has expired and the second determining having determined that the second timer has expired, perform the preventing.

In some example embodiments, the method may, responsive to having determined that the first timer has expired, having determined that the second timer has expired, and having determined that the additional energy is required, not perform the preventing. In some example embodiments, the method may further include third comparing the output voltage of the switched-mode power supply to a third threshold voltage, and the third comparing may detect whether or not an output overload condition exists. The method may, responsive to the third comparing detecting the output overload condition exists, not perform the preventing.

In some example embodiments, the determining may determine multiple disallowed cycle time period ranges corresponding to multiple bands of frequencies for which the switched-mode power supply should not operate in order to avoid generating the electromagnetic interference in the multiple bands of frequencies, and the preventing may prevent switching of the switched-mode power supply that would cause an end of a switching cycle to occur within any of the multiple disallowed cycle time period ranges. The permitting may permit switching of the switched-mode power supply that would cause the end of the switching cycle to occur outside of all of the disallowed cycle time period ranges. In some example embodiments, the method may further include modulating a cycle frequency of the switched-mode power supply through the cycle time period range corresponding to a band of frequencies for which the switched-mode power supply should not operate, and the determining may be performed on the modulated cycle frequency so that the preventing prevents switching of the switched-mode power supply that would cause an end of a switching cycle to occur within the disallowed cycle time period range as the cycle frequency is modulated through the cycle time period range.

In some example embodiments, the preventing may include limiting one of a peak inductor current level, an average inductor current level during a magnetization phase, an output voltage level, or an on-time of the switched-mode power supply, to limit a current cycle period so that a current switching cycle of the switched-mode power supply falls outside of the disallowed cycle time period range. In some example embodiments, the preventing may limit the peak inductor current level by incrementing or decrementing a control value that controls the peak inductor current level for switching cycles that fall within the disallowed cycle time period range. In some example embodiments, the method may further include timing a duration between cycle start times of the switched-mode power supply for a predetermined number of cycles, and the preventing may prevent switching of the switched-mode power supply only after the predetermined number of cycles has elapsed and if the timed duration falls within the disallowed cycle time period range.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to another type of switched-power system.

What is claimed is:

1. A method of reducing electromagnetic interference (EMI) by a switched-mode power supply, the method comprising:
   responsive to a change in demand or input voltage of the switched-mode power supply, adjusting an operating frequency of the switched-mode power supply;
   determining a disallowed cycle time period range corresponding to a band of frequencies for which the switched-mode power supply should be prevented from operating in order to avoid generating the electromagnetic interference in the band of frequencies;
   detecting that a switching event of the switched-mode power supply for the adjusted operating frequency would cause a switching cycle period to be within the disallowed time period range;
   responsive to detecting that the switching event of the switched-mode power supply would cause the switching cycle period to be within the disallowed cycle time period range, preventing switching of the switched-mode power supply; and
   responsive to detecting that the switching event of the switched-mode power supply would not cause the switching cycle period to be within the disallowed cycle time period, permitting switching of the switched-mode power supply.

2. The method of claim 1, wherein the determining step repetitively determines the disallowed cycle time period for consecutive cycles, and wherein the preventing and the permitting steps are repeated for the consecutive cycles.

3. The method of claim 1, further comprising:
   determining an early cycle time period range prior to the disallowed cycle time period range;
   determining that additional energy is required in a current or future cycle for maintaining an output voltage or current level of the switched-mode power supply; and
   responsive to determining that the additional energy is needed, completing the current switching cycle ahead of an ordinary cycle end time during the early cycle time period.

4. The method of claim 3, wherein the preventing and permitting are initiated by one or more timers of a control circuit in the switched-mode power supply, and wherein the method further comprises:
   first comparing an output voltage of the switched-mode power supply to a first threshold voltage to determine whether a switching cycle should be initiated;
   second comparing the output voltage of the switched-mode power supply to a second threshold voltage, wherein the second comparing determines whether or not the additional energy is required in the current or future cycle;
   first determining whether or not a first one of the timers has expired;
   second determining whether or not a second one of the timers has expired, wherein the second timer has a period longer than the first timer;
   responsive to the first determining step having determined that the first timer has not expired, performing the initiating the switching cycle in response to either of the first comparing step determining that the cycle should be initiated or the second comparing step determining that the additional energy is required;
   responsive to the first determining step having determined that the first timer has expired and the second determining step having determined that the second timer has not expired, initiating the switching cycle in response to the second comparing step determining that the additional energy is required; and
   responsive to the first determining step having determined that the first timer has expired and the second determining step having determined that the second timer has expired, performing the preventing.

5. The method of claim 4, further comprising responsive to the first determining step having determined that the first timer has expired and the second determining step having determined that the second timer has expired, and further responsive to the second comparing step determining that the additional energy is required, not performing the preventing.

6. The method of claim 5, further comprising:
   third comparing the output voltage of the switched-mode power supply to a third threshold voltage, wherein the third comparing step detects whether or not an output overload condition exists; and
   responsive to the third comparing step detecting the output overload condition exists, not performing the preventing.

7. The method of claim 1, wherein the determining step determines multiple disallowed cycle time period ranges corresponding to multiple bands of frequencies for which the switched-mode power supply should not operate in order to avoid generating the electromagnetic interference in the multiple bands of frequencies, and wherein the preventing step prevents switching of the switched-mode power supply that would cause an end of a switching cycle to occur within any of the multiple disallowed cycle time period ranges, and wherein the permitting step permits switching of the switched-mode power supply that would cause the end of the switching cycle to occur outside of all of the disallowed cycle time period ranges.

8. The method of claim 1, further comprising modulating a cycle frequency of the switched-mode power supply through the cycle time period range corresponding to a band of frequencies for which the switched-mode power supply should not operate, and wherein the determining step is performed on the modulated cycle frequency so that the preventing step prevents switching of the switched-mode power supply that would cause an end of a switching cycle to occur within the disallowed cycle time period range as the cycle frequency is modulated through the cycle time period range.

9. The method of claim 1, wherein the preventing step comprises limiting one of a peak inductor current level, an average inductor current level during a magnetization phase, an output voltage level, or an on-time of the switched-mode power supply, to limit a current cycle period so that a current switching cycle of the switched-mode power supply falls outside of the disallowed cycle time period range.

10. The method of claim 9, further comprising timing a duration between cycle start times of the switched-mode power supply for a predetermined number of cycles, and wherein the preventing step prevents switching of the switched-mode power supply only after the predetermined number of cycles has elapsed and if the timed duration falls within the disallowed cycle time period range.

11. The method of claim 9, wherein the preventing step limits the peak inductor current level by incrementing or decrementing a control value that controls the peak inductor current level for switching cycles that fall within the disallowed cycle time period range.

12. The method of claim 1, further comprising timing a duration between cycle start times of the switched-mode power supply for a predetermined number of cycles, and wherein the preventing step prevents switching of the switched-mode power supply only after the predetermined number of cycles has elapsed and if the timed duration falls within the disallowed cycle time period range.

13. A switched-mode power supply, comprising:
an input terminal for receiving an input voltage;
an output terminal for providing a voltage or current output of the switched-mode power supply;
a switching circuit for intermittently coupling an energy storage element to the input terminal and to an output terminal, wherein the switching circuit has an adjustable operating frequency that is adjusted responsive to a change in demand or the input voltage; and
a control circuit for controlling switching of the switching circuit, wherein the control circuit determines a disallowed cycle time period range corresponding to a band of frequencies for which the switched-mode power supply should be prevented from operating in order to avoid generating electromagnetic interference in the band of frequencies, detects that a switching event for an adjusted operating frequency would cause a switching cycle period to be within the disallowed time period range, and responsive to detecting that the switching event would cause the switching cycle period to be within the disallowed time period range, prevents switching of the switching circuit, and responsive to detecting that the switching event would not cause the end of the switching cycle to occur within disallowed cycle time period range, permits switching of the switching circuit.

14. The switched-mode power supply of claim 13, wherein control circuit repetitively determines the disallowed cycle time period for consecutive cycles, and prevents of permits switching for the consecutive cycles.

15. The switched-mode power supply of claim 13, wherein the control circuit further determines an early cycle time period range prior to the disallowed cycle time period range, determines that additional energy is required in a current or future cycle for maintaining an output voltage or current level of the switched-mode power supply, and responsive to determining that the additional energy is needed, completes the current switching cycle ahead of an ordinary cycle end time during the early cycle time period.

16. The switched-mode power supply of claim 15, wherein the control circuit comprises one or more timers that initiate preventing and permitting of switching, and wherein the control circuit compares an output voltage of the switched-mode power supply to a first threshold voltage to determine whether a switching cycle should be initiated, compares the output voltage of the switched-mode power supply to a second threshold voltage to determine whether or not the additional energy is required in the current or future cycle, determines whether or not a first one of the timers has expired, determines whether or not a second one of the timers has expired, wherein the second timer has a period longer than the first timer, and responsive to having determined that the first timer has not expired, initiates the switching cycle in response to either having determined that the cycle should be initiated or having determined that the additional energy is required, wherein the control circuit, responsive to having determined that the first timer has expired and having determined that the second timer has not expired, initiates the switching cycle in response to having determined that the additional energy is required, and wherein the control circuit, responsive to having determined that the first timer has expired and that that the second timer has expired, prevents initiation of the switching cycle.

17. The switched-mode power supply of claim 16, wherein the control circuit, responsive to having determined that the first timer has expired and the second timer has expired, and further responsive determining that the additional energy is required, does not prevent switching of the switched-mode power supply that would cause an end of a switching cycle to occur within the disallowed cycle time period range.

18. The switched-mode power supply of claim 17, wherein the control circuit further compares the output voltage of the switched-mode power supply to a third threshold voltage to detect whether or not an output overload condition exists, and in response to detecting the output overload condition exists, does not prevent switching of the switched-mode power supply that would cause an end of a switching cycle to occur within the disallowed cycle time period range.

19. The switched-mode power supply of claim 13, wherein the control circuit determines multiple disallowed cycle time period ranges corresponding to multiple bands of frequencies for which the switched-mode power supply should not operate in order to avoid generating the electromagnetic interference in the multiple bands of frequencies, and prevents switching of the switched-mode power supply that would cause an end of a switching cycle to occur within any of the multiple disallowed cycle time period ranges, and wherein the control circuit permits switching of the switched-mode power supply that would cause the end of the switching cycle to occur outside of all of the disallowed cycle time period ranges.

20. The switched-mode power supply of claim 13, wherein the control circuit modulates a cycle frequency of the switched-mode power supply through the cycle time period range corresponding to a band of frequencies for which the switched-mode power supply should not operate, and determines the disallowed cycle time period range based on the modulated cycle frequency so that the prevention of switching of the switched-mode power supply prevents switching that would cause an end of a switching cycle to occur within the disallowed cycle time period range as the cycle frequency is modulated through the cycle time period range.

21. The switched-mode power supply of claim 13, wherein the control circuit limits one of a peak inductor current level, an average inductor current level during a magnetization phase, an output voltage level, or an on-time of the switched-mode power supply, to limit a current cycle period so that a current switching cycle of the switched-mode power supply falls outside of the disallowed cycle time period range.

22. The switched-mode power supply of claim 21, wherein the control circuit times a duration between cycle start times of the switched-mode power supply for a predetermined number of cycles and prevents the switching only after the predetermined number of cycles has elapsed and if the timed duration falls within the disallowed cycle time period range.

23. The switched-mode power supply of claim 21, wherein the control circuit limits the peak inductor current level by incrementing or decrementing a control value that controls the peak inductor current level for switching cycles that fall within the disallowed cycle time period range.

24. The switched-mode power supply of claim 13, wherein the control circuit times a duration between cycle start times of the switched-mode power supply for a predetermined number of cycles and prevents the switching only after the predetermined number of cycles has elapsed and if the timed duration falls within the disallowed cycle time period range.

* * * * *

UNITED STATES PATENT AND TRADEMARK OFFICE
CERTIFICATE OF CORRECTION

PATENT NO. : 12,316,217 B1
APPLICATION NO. : 18/325036
DATED : May 27, 2025
INVENTOR(S) : McCoy et al.

It is certified that error appears in the above-identified patent and that said Letters Patent is hereby corrected as shown below:

In the Specification

In Column 3, Lines 3-4, delete "pulse frequency mode (PFM)," and insert -- pulse-frequency modulated (PFM) mode, --, therefor.

In Column 3, Line 22, delete "(A voidance" and insert -- (Avoidance --, therefor.

In Column 3, Line 65, delete "A voidance" and insert -- Avoidance --, therefor.

In the Claims

In Column 11, Line 65, in Claim 14, delete "of permits" and insert -- or permits --, therefor.

In Column 12, Line 30, in Claim 16, delete "that that" and insert -- that --, therefor.

In Column 12, Line 35, in Claim 17, delete "responsive determining" and insert -- responsive to determining --, therefor.

Signed and Sealed this
Fifteenth Day of July, 2025

Coke Morgan Stewart
*Acting Director of the United States Patent and Trademark Office*